US012566466B2

(12) United States Patent
Wang et al.

(10) Patent No.: US 12,566,466 B2
(45) Date of Patent: Mar. 3, 2026

(54) BODY BIAS CIRCUIT AND BODY BIAS GENERATION METHOD

(71) Applicant: Richtek Technology Corporation, Hsinchu (TW)

(72) Inventors: Chih-hsien Wang, Taoyuan (TW); Chu-hua Lee, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 183 days.

(21) Appl. No.: 18/507,084

(22) Filed: Nov. 12, 2023

(65) Prior Publication Data

US 2024/0231409 A1 Jul. 11, 2024

(30) Foreign Application Priority Data

Jan. 5, 2023 (TW) ................................ 112100440

(51) Int. Cl.
*G05F 3/20* (2006.01)
*G05F 3/24* (2006.01)

(52) U.S. Cl.
CPC .............. *G05F 3/205* (2013.01); *G05F 3/242* (2013.01)

(58) Field of Classification Search
USPC .......................................... 327/537, 534–535
See application file for complete search history.

(56) References Cited

U.S. PATENT DOCUMENTS 4,518,880 A * 5/1985 Masuda ........... H03K 19/00384 327/437
5,297,097 A * 3/1994 Etoh ..................... G11C 11/406 327/530
6,670,655 B2 * 12/2003 Lukes .................. H10D 30/721 257/217
7,098,724 B2 * 8/2006 Pan .................. H03K 19/00315 327/535
7,129,752 B2 * 10/2006 Bayer .............. H03K 3/356113 326/63
7,474,144 B2 * 1/2009 Baumgartner .......... G05F 3/262 327/543
7,501,880 B2 * 3/2009 Bonaccio ................ G05F 3/262 327/535
7,746,154 B2 * 6/2010 Merandat ............. H03K 17/005 327/407
7,760,007 B2 * 7/2010 Holzmann ........... H03K 17/063 327/437

(Continued)

*Primary Examiner* — Thomas J. Hiltunen
(74) *Attorney, Agent, or Firm* — Huan-Yi Lin

(57) ABSTRACT

A body bias circuit configured to generate a body bias to a body of a MOS switch. The body bias circuit includes: an intrinsic MOS device having the same conductivity type with the MOS switch and having an intrinsic threshold voltage; and an operational regulation circuit coupled to the intrinsic MOS device and configured to generate the body bias according to a voltage of one terminal of the MOS switch and the intrinsic threshold voltage, such that a threshold voltage of the MOS switch inversely tracking the intrinsic threshold voltage. The body bias is lower than each voltage of both terminals of the MOS switch. The body bias is configured to an extent that an ON resistance of the MOS switch is lower than a predetermined value during a conducting operation, and/or a leakage current of the MOS switch is lower than a predetermined value during a non-conducting operation.

22 Claims, 8 Drawing Sheets

(56) References Cited

U.S. PATENT DOCUMENTS

| | | | | |
|---|---|---|---|---|
| 11,392,158 | B2 * | 7/2022 | Malave-Perez | G05F 1/461 |
| 2006/0192611 | A1 * | 8/2006 | Bonaccio | G05F 3/262<br>327/543 |
| 2020/0310482 | A1 * | 10/2020 | Azam | G05F 3/242 |

* cited by examiner

BODY BIAS CIRCUIT AND BODY BIAS GENERATION METHOD

CROSS REFERENCE

The present invention claims priority to TW 112100440 filed on Jan. 5, 2023.

BACKGROUND OF THE INVENTION

Field of Invention

The present invention relates to a body bias circuit, in particular to a body bias circuit and body bias generation method capable of making the body effect of a MOS device within an appropriate range and not affected by process variation.

Description of Related Art

Prior art works related to the present invention include: "A ±4-A High-Side Current Sensor With 0.9% Gain Error From −40° C. to 85° C. Using an Analog Temperature Compensation Technique." (2018—JSSCC), and "A Voltage Monitoring IC With HV Multiplexer and HV Transceiver for Battery Management Systems." (2015—IEEEVLSI).

In typical applications, the inequality relation of voltage levels between the source and drain of a metal oxide semiconductor (MOS) device is fixed. That is, the inequality relation of voltage levels between the source and drain will not be turned opposite typically. Therefore, the body bias voltage (body bias) of the MOS device is usually biased by a fixed voltage (for example, the body terminal of the P-type MOS device is biased to the power supply potential, and the body terminal of the N-type MOS device is biased to the ground potential), or is coupled to a fixed node (for example, the body terminal is coupled to the source terminal).

When the voltage levels at an input end and an output coupled to a MOS device is uncertain (for example, under situations having variable input voltage or having output voltage, when transmitting analog signals, or where the source and drain should be swapped), the source and drain can be corresponded to different ends. Another situation is when the threshold voltages of MOS devices in different integrated circuits are different due to process variations. The body bias needs to be adjusted or switched adaptively to prevent the body diode from conduction in some states for example in the above situations. Some prior art techniques for adaptive adjustment or switching of the body bias are described as follows.

Referring to FIG. 1 which shows a schematic diagram of a prior art path switch circuit which adopts reversed body diodes for reverse current blocking. In FIG. 1, the voltage Vp1 may be greater than or lower than the voltage Vp2. The MOS device M1 and the MOS device M2 are coupled in series, and the body terminals of the MOS device M1 and the MOS device M2 are reversely connected, so that when the inequality of the voltage Vp1 and the voltage Vp2 is not fixed, the body diode can be prevented from being conductive. However, this conventional art requires two MOS devices to be connected in series, which results in larger on-resistance and larger circuit area, thereby leads to poorer electrical characteristics and higher cost.

Referring to FIG. 2 which shows a schematic diagram of a body bias circuit of the conventional art 10. The body bias circuit 10 is configured to provide the body bias Vb to the MOS switch SW. Similarly, the voltage Vp1 of FIG. 2 may be greater than or lower than the voltage Vp2. The MOS device M3 and the MOS device M4 of the body bias circuit 10 of FIG. 2 are configured to adaptively select the smaller one of the voltages Vp1 and Vp2 as the body bias Vb of the MOS switch SW, so that the body bias Vb of MOS switch SW is never greater than the voltage Vp1 and Vp2. However, the conventional art has the following drawbacks. When the voltage difference between the voltage Vp1 and the voltage Vp2 is larger, the MOS device M3 and the MOS device M4 must be implemented with devices having high voltage tolerance, which will lead to high cost.

SUMMARY OF THE INVENTION

The present invention provides a body bias circuit configured to generate a body bias for biasing a body terminal of a metal oxide semiconductor (MOS) switch, wherein the body bias circuit includes: an intrinsic MOS device, having the same conductivity type as the MOS switch and having an intrinsic threshold voltage; and an operational regulation circuit, coupled to the intrinsic MOS device and configured to generate the body bias according to a first voltage at a first terminal of the MOS switch and the intrinsic threshold voltage; wherein the body bias is lower than the first voltage and a second voltage of a second terminal of the MOS switch; and wherein the operational regulation circuit generates the body bias, so that an on-resistance of the MOS switch is lower than a preset on-resistance threshold when the MOS switch is in a conduction operation, and/or a leakage current of the MOS switch is lower than a preset leakage current threshold when the MOS switch is in a non-conduction operation.

In one embodiment, the body bias is the first voltage minus an offset voltage.

In one embodiment, the threshold voltage of the MOS switch reversely tracks the intrinsic threshold voltage, and the offset voltage is negatively related to the intrinsic threshold voltage, so that the body bias is positively related to the intrinsic threshold voltage.

In one embodiment, the offset voltage is linearly and negatively related to, or non-linearly and negatively related to the intrinsic threshold voltage.

In one embodiment, the operational regulation circuit includes: a reference current generating circuit, configured to receive a reference voltage and generate a reference current positively related to the reference voltage, wherein the reference current flows through the intrinsic MOS device; and a bias current generating circuit, configured to generate a bias current according to the reference current, so as to generate the offset voltage.

In one embodiment, the reference current generating circuit includes: a first resistor, coupled between the reference voltage and the intrinsic MOS device; and the intrinsic MOS device, connected in series with the first resistor.

In one embodiment, the bias current generating circuit includes: a current mirror circuit, configured to mirror and amplify the reference current to generate the bias current; and a second resistor, coupled between the first voltage and the current mirror circuit, so that the bias current flows through the second resistor.

In one embodiment, the current mirror circuit has a magnification (A), the first resistor has a first resistance (R1), the second resistor has a second resistance (R2), and a body diode of the MOS switch has a forward conduction voltage (Vbd), wherein the magnification (A), the first resistance (R1), the second resistance (R2), the reference voltage (Vref), the intrinsic threshold voltage (Vth), the forward conduction voltage (Vbd), and an absolute value of a difference between the first voltage (V1) and the second voltage (V2) have the following relationship:

$$|V1 - V2| < A \cdot \frac{R2}{R1} \cdot (Vref - Vth) + Vbd$$

In one embodiment, the reference current generating circuit includes a voltage divider circuit for receiving the reference voltage, and generating a reference divided voltage positively related to the reference voltage as a gate-source voltage of the intrinsic MOS device, the reference divided voltage is configured to control the intrinsic MOS device to generate the bias current; and wherein the reference current is proportional to the bias current.

In one embodiment, the bias current generating circuit includes a bias resistor connected in series with the intrinsic MOS device, the bias resistor has a bias resistance (R3), and the body diode of the MOS switch has a forward conduction voltage (Vbd), wherein the bias resistance (R3), the reference divided voltage (Vd), the intrinsic threshold voltage (Vth), the forward conduction voltage (Vbd), and an absolute value of a difference between the first voltage (V1) and the second voltage (V2) have the following relationship:

$$|V1 - V2| < R3 \cdot K \cdot (Vd - Vth)^2 + Vbd;$$

where K is the current constant (WμnCox/2L) of the MOS switch.

In one embodiment, the reference current generating circuit includes: a self-bias circuit, configured to generate the reference current; and a first resistor, coupled between the gate and the source of the intrinsic MOS device, wherein the self-bias circuit mirrors the reference current to generate a first current which flows through the first resistor.

In one embodiment, the bias current generating circuit includes: a current source, configured to generate a constant current; an identical intrinsic MOS device, having an intrinsic threshold voltage the same as the intrinsic MOS device, a gate and a source of the identical intrinsic MOS device respectively electrically connected to the gate and the source of the intrinsic MOS device, the identical intrinsic MOS device coupled to the current source, and the identical intrinsic MOS device being configured to generate a second current, wherein the second current is shunted from the current source, and the second current is equal to the intrinsic threshold voltage divided by a resistance of the first resistor; and a current mirror circuit, coupled with the current source and the first voltage, configured to receive a third current, wherein the third current is the constant current minus the second current, and the current mirror circuit amplifies and mirrors the third current to generate the bias current to flow through a second resistor so as to generate the body bias, wherein the second resistor is coupled between the first voltage and the body bias.

In one embodiment, the current mirror circuit has a magnification (A), the first resistor has a first resistance (R1), the second resistor has a second resistance (R2), and the body diode of the MOS switch has a forward conduction voltage (Vbd), wherein the magnification (A), the first resistance (R1), the second resistance (R2), the intrinsic threshold voltage (Vth), the forward conduction voltage (Vbd), and an absolute value of the difference between the first voltage (V1) and the second voltage (V2) have the following relationship:

$$|V1 - V2| < A \cdot \left(\mathrm{Is}1 - \frac{Vth}{R1}\right) \cdot R2 + Vbd$$

where Is1 is the constant current.

The present invention also provides a body bias generation method, configured to generate a body bias, wherein the body bias is provided to a body terminal of a metal oxide semiconductor (MOS) switch, and the body bias generation method includes: providing an intrinsic MOS device, having the same conductivity type as the MOS switch, configured to generate an intrinsic threshold voltage; and generating the body bias according to a first voltage on a first terminal of the MOS switch and the intrinsic threshold voltage; wherein the body bias is lower than the first voltage and a second voltage on a second terminal of the MOS switch; wherein an on-resistance of the MOS switch is lower than a preset on-resistance threshold when the MOS switch is in a conduction operation, and/or a leakage current of the MOS switch is lower than a preset leakage current threshold when the MOS switch is in a non-conduction operation.

In one embodiment, the body bias is the first voltage minus an offset voltage.

In one embodiment, the threshold voltage of the MOS switch reversely tracks the intrinsic threshold voltage, and the offset voltage is negatively related to the intrinsic threshold voltage, so that the body bias is positively related to the intrinsic threshold voltage.

In one embodiment, the offset voltage is linearly and negatively related to, or non-linearly and negatively related to the intrinsic threshold voltage.

In one embodiment, the step of generating the bias voltage includes: receiving a reference voltage, generating a reference current positively related to the reference voltage, wherein the reference current flows through the intrinsic MOS device; and generating a bias current according to the reference current, and further generating the offset voltage.

In one embodiment, the step of generating the reference current positively related to the reference voltage includes: coupling a first resistor between the reference voltage and the intrinsic MOS device, wherein the intrinsic MOS device is connected in series with the first resistor.

In one embodiment, the step of generating the bias current includes: mirroring and amplifying the reference current to generate the bias current; and coupling a second resistor between the first voltage and a current mirror circuit, so that the bias current flows through the second resistor.

In one embodiment, the current mirror circuit has a magnification (A); wherein the first resistor has a first resistance (R1), the second resistor has a second resistance (R2), and the body diode of the MOS switch has a forward conduction voltage (Vbd), wherein the magnification (A), the first resistance (R1), the second resistance (R2), the reference voltage (Vref), the intrinsic threshold voltage (Vth), the forward conduction voltage (Vbd), and an absolute value of the difference between the first voltage (V1) and the second voltage (V2) have the following relationship:

$$|V1 - V2| < A \cdot \frac{R2}{R1} \cdot (Vref - Vth) + Vbd$$

In one embodiment, the step of generating the reference current positively related to the reference voltage includes: generating a reference divided voltage positively related to the reference voltage, wherein the reference divided voltage is coupled to provide a gate-source voltage of the intrinsic MOS device, and the reference divided voltage, so as to control the intrinsic MOS device to generate the bias current; and wherein the reference current is proportional to the bias current.

In one embodiment, the step of generating the bias current includes providing a bias resistor connected in series with the intrinsic MOS device; wherein the bias resistor has a bias resistance (R3), and the body diode of the MOS switch has a forward conduction voltage (Vbd), wherein the bias resistance (R3), the reference divided voltage (Vd), the intrinsic threshold voltage (Vth), the forward conduction voltage (Vbd), and an absolute value of the difference between the first voltage (V1) and the second voltage (V2) have the following relationship:

$$|V1 - V2| < R3 \cdot K \cdot (Vd - Vth)^2 + Vbd$$

wherein K is the current constant (WμnCox/2L) of the MOS switch.

In one embodiment, the step of generating the reference current positively related to the reference voltage includes: generating the reference current by a self-bias circuit; and coupling a first resistor between a gate and a source of the intrinsic MOS device, wherein the self-bias circuit mirrors the reference current to generate a first current which flows through the first resistor.

In one embodiment, the step of generating the bias current includes: generating a constant current; providing an identical intrinsic MOS device having an intrinsic threshold voltage the same as the intrinsic MOS device, wherein the gate and the source of the identical intrinsic MOS device are electrically connected to the gate and the source of the intrinsic MOS device, respectively, the identical intrinsic MOS device is coupled to the constant current, the identical intrinsic MOS device is configured to generate a second current, the second current is shunted from the constant current, and the second current is equal to the intrinsic threshold voltage divided by the resistance of the first resistor; and receiving a third current, which is the constant current minus the second current, and magnifying and mirroring the third current to generate the bias current to flow through a second resistor to generate the body bias, wherein the second resistor is coupled between the first voltage and the body bias.

The present invention proposes a body bias circuit, which can not only prevent the body diode of the MOS device from being turned on when the voltage at both terminals of the source and drain of the MOS device is uncertain, but also can keep the body effect of the MOS device in an appropriate range, thereby making the on-resistance and the leakage current are not too large. In addition, with the body bias circuit of the present invention, the on-resistance and leakage current of the MOS device can achieve the above-mentioned goals under the various process variation.

In one embodiment, the step of magnifying and mirroring the third current includes providing a current mirror circuit having a magnification (A); wherein the first resistor has a first resistance (R1), the second resistor has a second resistance (R2), and the body diode of the MOS switch has a forward conduction voltage (Vbd), wherein the magnification (A), the first resistance (R1), the second resistance (R2), the intrinsic threshold voltage (Vth), the forward conduction voltage (Vbd), and an absolute value of a difference between the first voltage (V1) and the second voltage (V2) have the following relationship:

$$|V1 - V2| < A \cdot \left(Is1 - \frac{Vth}{R1}\right) \cdot R2 + Vbd$$

where Is1 is the constant current.

The objectives, technical details, features, and effects of the present invention will be better understood with regard to the detailed description of the embodiments below, with reference to the attached drawings.

DESCRIPTION OF THE PREFERRED EMBODIMENTS

The drawings in the invention are all schematic, mainly intended to show the coupling relationship between the various circuits, and the relationship between the signal waveforms. As for the circuits, signal waveforms and frequencies, they are not drawn to scale.

Figure 1:
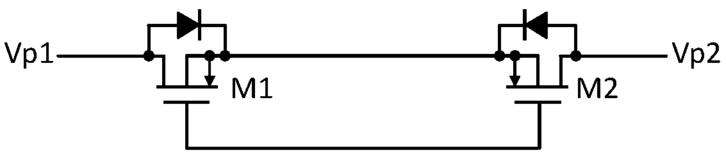
Fig. 1 (Prior Art)
FIG. 1 shows a schematic diagram of a prior art path switch circuit which adopts reversed body diodes for reverse current blocking.
Figure 2:
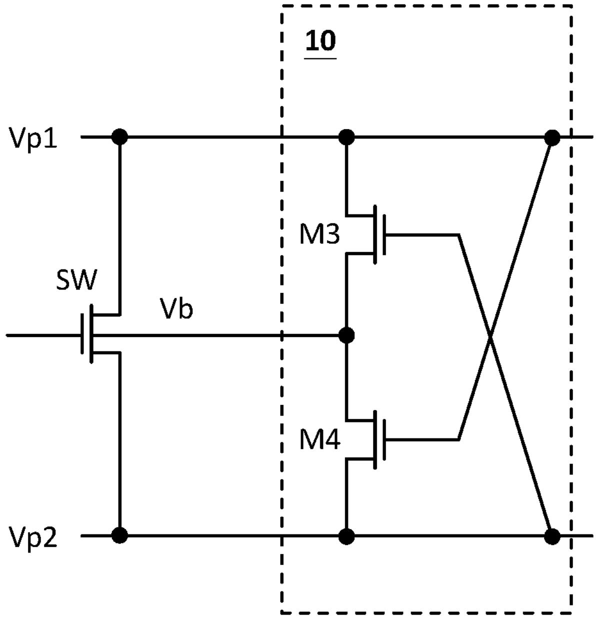
Fig. 2 (Prior Art)
FIG. 2 shows a schematic diagram of a body bias circuit of the conventional art.
Figure 3:
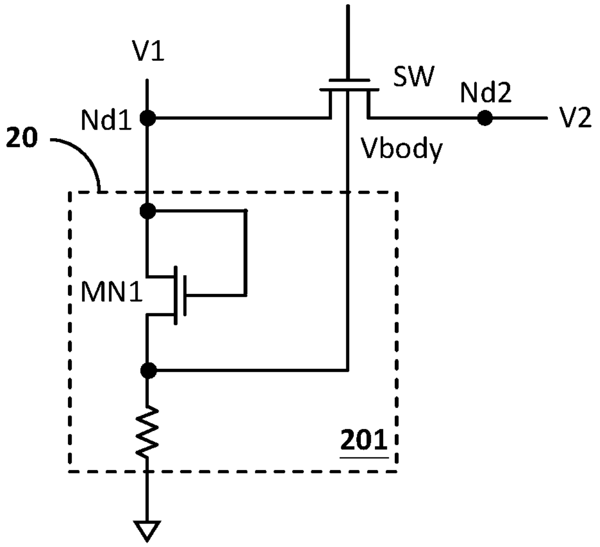
FIG. 3 shows a schematic diagram of a body bias circuit according to an embodiment of the present invention.

Referring to FIG. 3 which shows a schematic block diagram of the body bias circuit according to an embodiment of the present invention. As shown in FIG. 3, in an embodiment, the body bias circuit 20 is configured to generate the body bias Vbody for biasing the body terminal of the metal oxide semiconductor (MOS) switch SW. The body bias circuit 20 includes: an intrinsic MOS device MN1 and an operational regulation circuit 201. In an embodiment, the gate and the drain of the intrinsic MOS device MN1 are coupled to each other to form a diode-connected MOSFET, so that the body bias circuit 20 provides the body bias voltage Vbody to the MOS switch SW by subtracting the forward conduction voltage of the MOS diode from the first voltage V1 of the first terminal Nd1 of the MOS switch SW, which is equivalent to the threshold voltage of the intrinsic MOS device MN1. The intrinsic MOS device MN1 has the same conductivity type as the MOS switch SW, and has an intrinsic threshold voltage Vth. In the present embodiment, both the intrinsic MOS device MN1 and the MOS switch SW are N-type MOS devices. Note that the intrinsic threshold voltage Vth of the intrinsic MOS device MN1 refers to a threshold voltage without body effect. In the present embodiment, the intrinsic MOS device MN1 is also shared as part of the operational regulation circuit 201.

In one embodiment, the body bias Vbody is lower than the first voltage V1 and the second voltage V2 of the second terminal Nd2 of the MOS switch SW, so as to prevent the body diode of the MOS switch SW from conduction. The operational regulation circuit 201 controls the level of the body bias Vbody to an extent, so that the on-resistance of the MOS switch SW is lower than the preset on-resistance threshold when the MOS switch SW is in the conduction operation, and/or that the leakage current of the MOS switch SW is lower than the preset leakage current threshold when the MOS switch is in the non-conduction operation. As a result, the MOS switch can have better electrical characteristics compared with the conventional art.

Note that, the aforementioned first terminal Nd1 and the second terminal Nd2 of the MOS switch SW are respectively corresponding to the source or drain of the MOS switch SW. The inequality relation between the first voltage V1 and the second voltage determines which of the first terminal Nd1 and the second terminal Nd2 corresponds to the source or the drain.

Figure 4:
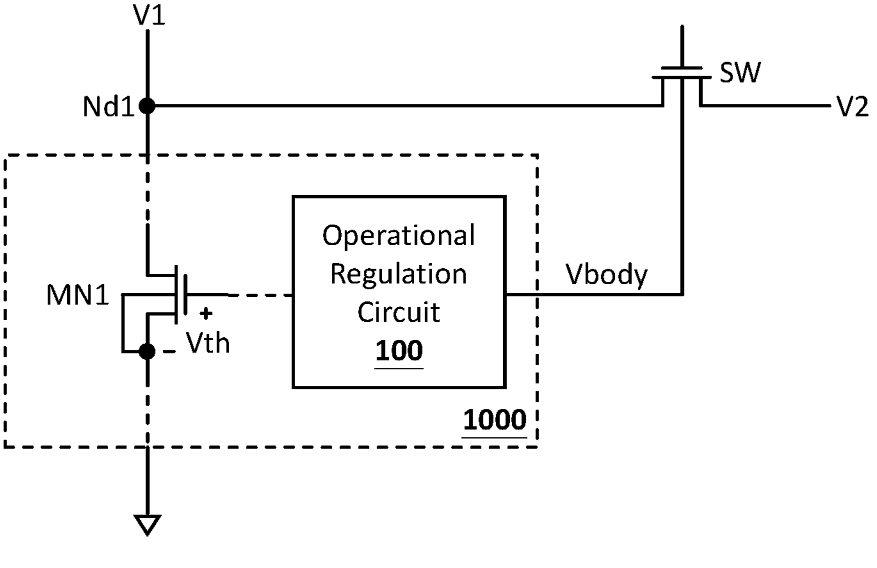
FIG. 4 shows a schematic block diagram of the body bias circuit according to another embodiment of the present invention.

Please refer to FIG. 4, which shows a schematic block diagram of the body bias circuit according to an embodiment of the present invention. As shown in FIG. 4, in an embodiment, the body bias circuit 1000 is configured to generate the body bias Vbody for biasing the body terminal of the metal oxide semiconductor (MOS) switch SW. The body bias circuit 1000 includes: an intrinsic MOS device MN1 and an operational regulation circuit 100. In an embodiment, the gate and the source of the intrinsic MOS device MN1 are coupled to each other. The intrinsic MOS device MN1 has the same conductivity type as the MOS switch SW, and has an intrinsic threshold voltage Vth. In the present embodiment, both the intrinsic MOS device MN1 and the MOS switch SW are N-type MOS devices. Note that the intrinsic threshold voltage Vth of the intrinsic MOS device MN1 refers to a threshold voltage without body effect.

In an embodiment, the operational regulation circuit 100 is coupled to the intrinsic MOS device MN1, and is configured to generate the body bias Vbody according to the first voltage V1 on the first terminal Nd1 of the MOS switch SW and the intrinsic threshold voltage Vth, such that the threshold voltage of the MOS switch SW inversely tracking the intrinsic threshold voltage Vth. In an embodiment, even when the inequality relation between the first voltage V1 and the second voltage V2 on the second terminal of the MOS switch SW is not fixed, i.e, when the first voltage V1 may be greater than or less than the second voltage V2, the body bias voltage Vbody can be controlled to always be lower than the first voltage V1 and the second voltage V2 to an appropriate range. In an embodiment, The operational regulation circuit 100 controls the level of the body bias Vbody to an extent, so that the on-resistance of the MOS switch SW is lower than the preset on-resistance threshold when the MOS switch SW is in the conduction operation, and/or that the leakage current of the MOS switch SW is lower than the preset leakage current threshold when the MOS switch is in the non-conduction operation.

Note that when the MOS switch SW and the intrinsic MOS device MN1 are on the same substrate and have the same body effect, their respective threshold voltages will track each other (that is, their respective threshold voltages have a positive correlation relationship). However, this will cause the on-resistance and leakage current of the MOS switch SW to deviate from the desired target range. To overcome this issue, the intrinsic MOS device MN1 and the operational regulation circuit 100 of the body bias circuit of the present invention are further configured to control the threshold voltage of the MOS switch SW reversely tracking the intrinsic threshold voltage Vth (that is, the threshold voltage of the MOS switch SW has a negative correlation with the threshold voltage of the intrinsic MOS device MN1). As a result, desirably, the on-resistance and leakage current of the MOS switch SW can still reach the above-mentioned desired target ranges under the condition of process variation.

Figure 5:
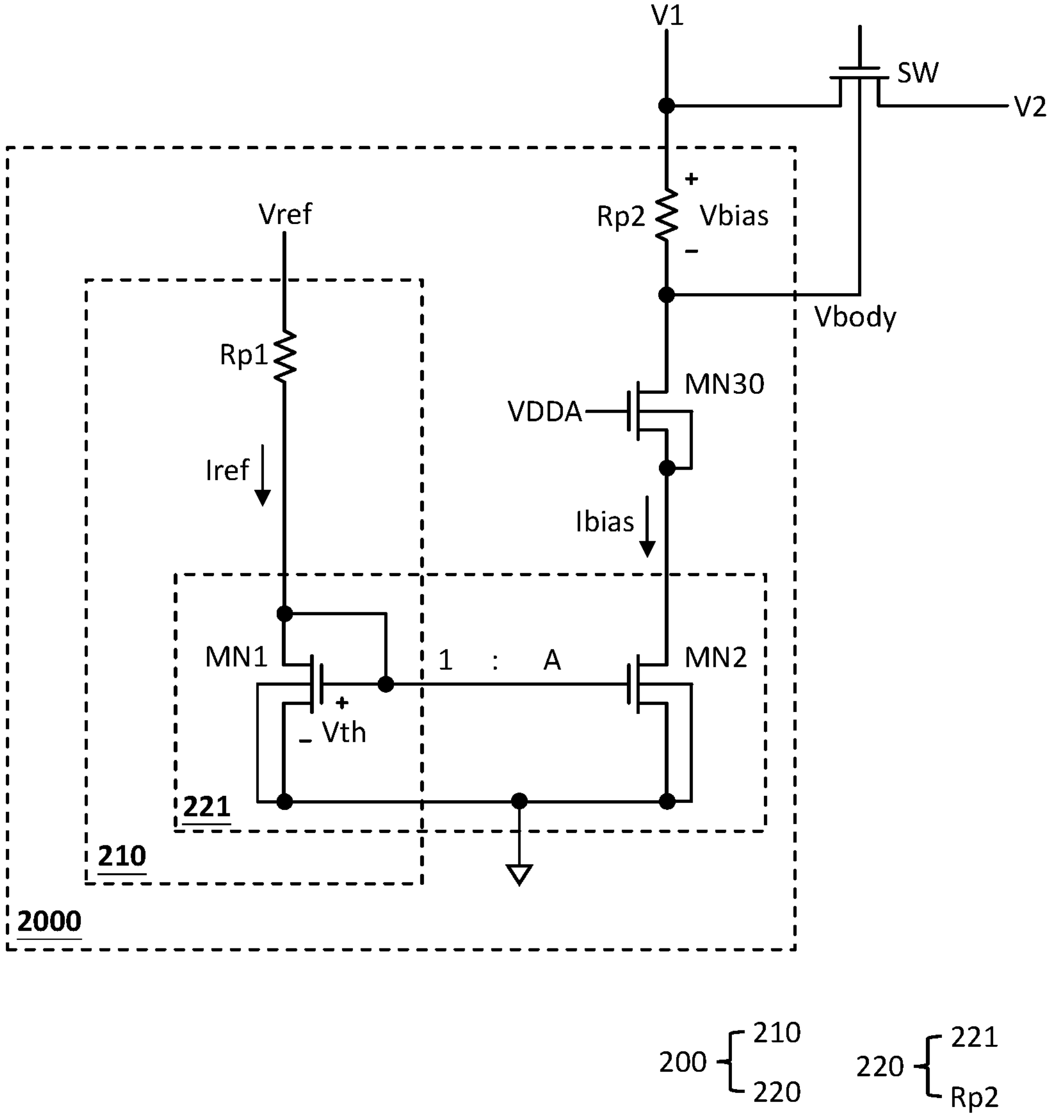
FIG. 5 shows a schematic diagram of the body bias circuit according to a specific embodiment of the present invention.

Please refer to FIG. 5, which shows a schematic diagram of the body bias circuit according to a specific embodiment of the present invention. In an embodiment, the body bias circuit 2000 of FIG. 5 includes: an intrinsic MOS device MN1, an operational regulation circuit 200 and a MOS device MN30. In an embodiment, the operational regulation circuit 200 includes: a reference current generating circuit 210 and a bias current generating circuit 220. In an embodiment, the reference current generating circuit 210 is configured to receive the reference voltage Vref to generate a reference current Iref positively related to the reference voltage Vref, wherein the reference current Iref flows through the intrinsic MOS device MN1. In an embodiment, the bias current generating circuit 220 generates the bias current Ibias according to the reference current Iref, so as to generate the offset voltage Vbias, wherein the offset voltage Vbias will be described later. In the present embodiment, the drain and the gate of the intrinsic MOS device MN1 are coupled to each other, and the intrinsic MOS device MN1 is configured in the reference current generating circuit 210 and the bias current generating circuit 220 at the same time, that is, the reference current generating circuit 210 and the bias current generating circuit 220 share the intrinsic MOS device MN1 of the body bias circuit 2000.

In an embodiment, as shown in FIG. 5, the reference current generating circuit 210 includes: a resistor Rp1 and an intrinsic MOS device MN1. In the present embodiment, the resistor Rp1 is coupled between the reference voltage Vref and the intrinsic MOS device MN1, and the intrinsic MOS device MN1 is coupled in series with the resistor Rp1. In an embodiment, the bias current generating circuit 220 includes: a current mirror circuit 221 and a resistor Rp2. In an embodiment, the current mirror circuit 221 includes an intrinsic MOS device MN1 and a MOS device MN2, and the body terminal and source of the intrinsic MOS device MN1 and the body and source of the MOS device MN2 are coupled to each other. In the present embodiment, the current mirror circuit 221 is configured to mirror and amplify the reference current Iref to generate the bias current Ibias. In an embodiment, the resistor Rp2 is coupled between the first voltage V1 and the current mirror circuit 221, so that the bias current Ibias flows through the resistor Rp2. In the present embodiment, the MOS device MN30 is coupled between the resistor Rp2 and the current mirror circuit 221, the gate of the MOS device MN30 is coupled to the voltage VDDA and the body terminal is coupled to the source, thereby blocking the high voltage of the drain of the MOS device MN30.

Please continue to refer to FIG. 5. In an embodiment, the bias current Ibias flows through the resistor Rp2 to generate an offset voltage Vbias. The body bias Vbody is the first voltage V1 minus the offset voltage Vbias, and the offset voltage Vbias is negatively related to the intrinsic threshold voltage Vth, such that the body bias Vbody is positively related to the intrinsic threshold voltage Vth. In an embodiment, the current mirror circuit 221 has a magnification A, the resistor Rp1 has a resistance R1, and the resistor Rp2 has a resistance R2. In an embodiment, the body bias Vbody, the first voltage V1, the resistance R1, the resistance R2, the reference voltage Vref, and the intrinsic threshold voltage Vth have the following relationship:

$$Vbody = V1 - A \cdot \frac{R2}{R1} \cdot (Vref - Vth) \quad \text{(equation 1)}$$

In an embodiment, the body diode of the MOS switch SW has a forward conduction voltage Vbd, wherein the magnification A, the resistance R1, the resistance R2, the reference voltage Vref, the intrinsic threshold voltage Vth, the forward conduction voltage (Vbd), and an absolute value of a difference between the first voltage V1 and the second voltage V2 have the following relationship:

$$|V1 - V2| < A \cdot \frac{R2}{R1} \cdot (Vref - Vth) + Vbd \quad \text{(inequation 2)}$$

The above equation 1 and inequation 2 show that, in an embodiment, the offset voltage Vbias is linearly and negatively related to the intrinsic threshold voltage Vth. Note that, by adaptively selecting the voltage value of the reference voltage Vref, the body bias circuit of the present invention can guarantee the body bias voltage Vbody to be lower than the first voltage V1 and the second voltage V2 with an appropriate range even when the inequality relation between the first voltage V1 and the second voltage V2 is not fixed.

Figure 6:
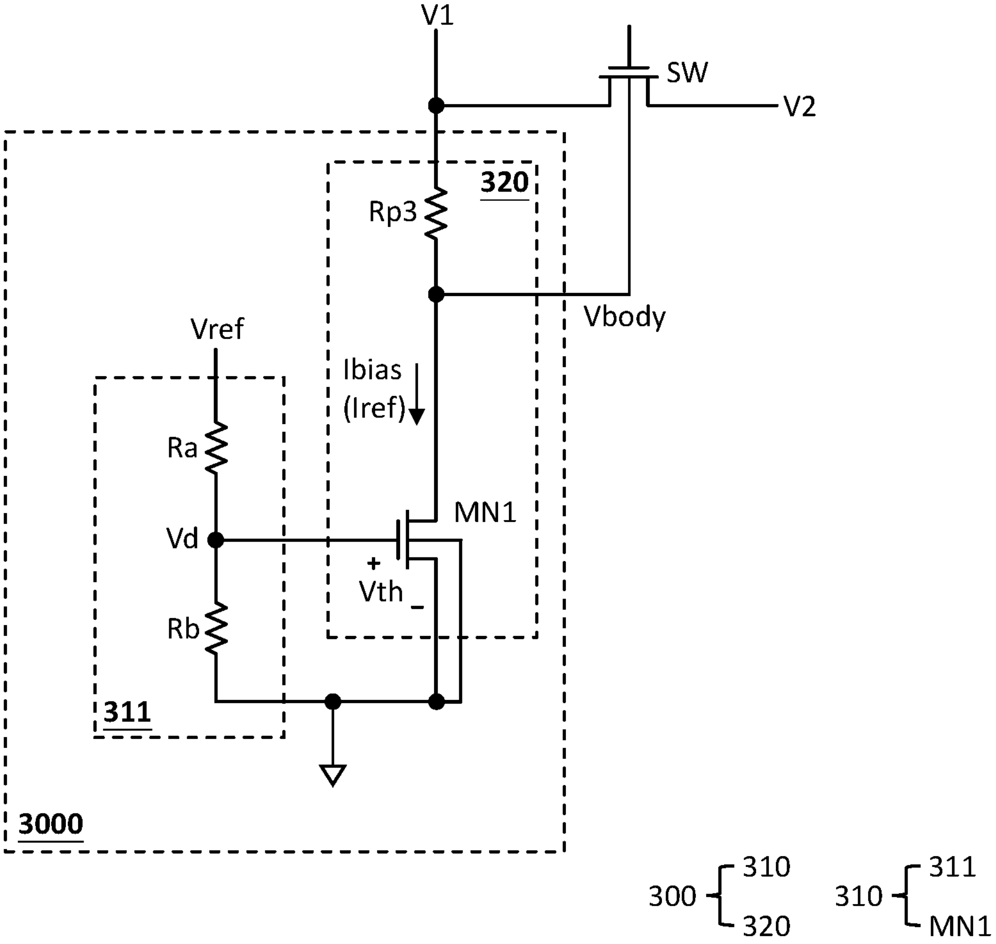
FIG. 6 shows a schematic diagram of the body bias circuit according to another specific embodiment of the present invention.

Please refer to FIG. 6, which shows a schematic diagram of the body bias circuit according to a specific embodiment of the present invention. In an embodiment, the body bias circuit 3000 of FIG. 6 includes: an intrinsic MOS device MN1 and an operational regulation circuit 300. In an embodiment, the operational regulation circuit 300 includes: a reference current generating circuit 310 and a bias current generating circuit 320. In an embodiment, the reference current generating circuit 310 includes a voltage divider circuit 311 (including a resistor Ra and a resistor Rb). The voltage divider circuit 311 is configured to receive the reference voltage Vref to generate a reference divided voltage Vd positively related to the reference voltage Vref as the gate-source voltage of the intrinsic MOS device MN1, and the reference divided voltage Vd is configured to control the intrinsic MOS device MN1 to generate a bias current Ibias. In an embodiment, the reference current Iref is proportional to the bias current Ibias. In the present embodiment, the reference current Iref is equal to the bias current Ibias.

In an embodiment, as shown in FIG. 6, the bias current generating circuit 320 includes a bias resistor Rp3 and an intrinsic MOS device MN1 connected in series. In the present embodiment, the reference current generating circuit 310 and the bias current generating circuit 320 share the intrinsic MOS device MN1 of the body bias circuit 3000. In an embodiment, the bias resistor Rp3 has a bias resistance R3, and the body diode of the MOS switch SW has a forward conduction voltage Vbd, wherein the bias resistance R3, the reference divided voltage Vd, the intrinsic threshold voltage Vth, the forward conduction voltage (Vbd), and an absolute value of the difference between the first voltage V1 and the second voltage V2 have the following relationship:

$$|V1 - V2| < R3 \cdot K \cdot (Vd - Vth)^2 + Vbd \quad \text{(inequation 3)}$$

In the above inequation 3, K is the current constant (WμnCox/2L) of the MOS switch SW. It can be known from inequation 3 that, in an embodiment, the offset voltage Vbias is non-linearly and negatively related to the intrinsic threshold voltage Vth.

Figure 7:
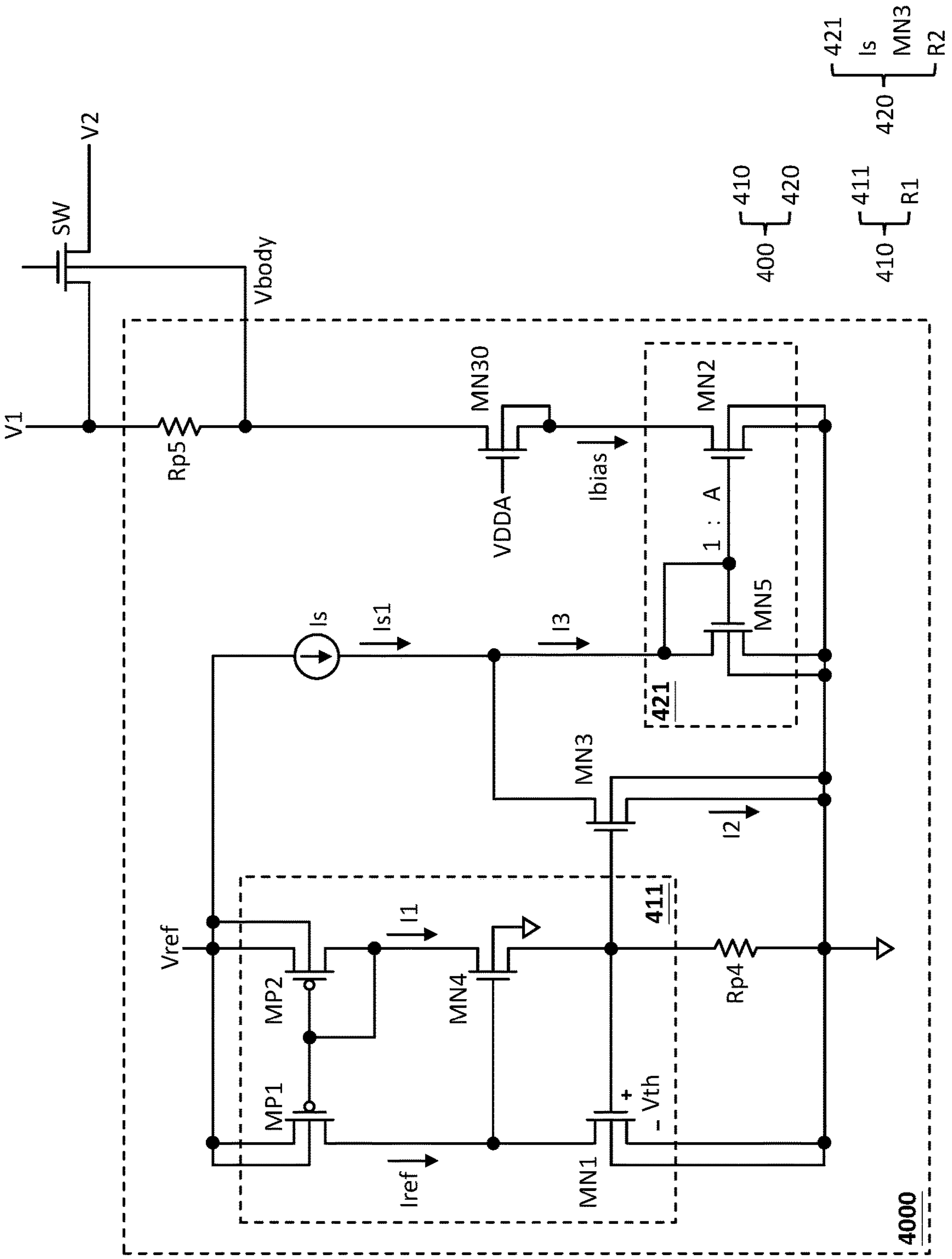
FIG. 7 shows a schematic diagram of the body bias circuit according to yet another specific embodiment of the present invention.

Please refer to FIG. 7, which shows a schematic diagram of the body bias circuit according to a specific embodiment of the present invention. In an embodiment, the body bias circuit 4000 of FIG. 7 includes: an intrinsic MOS device MN1, an operational regulation circuit 400 and a MOS device MN30. In an embodiment, the operational regulation circuit 400 includes: a reference current generating circuit 410 and a bias current generating circuit 420. In an embodiment, the reference current generating circuit 410 includes: a self-bias circuit 411 and a resistor Rp4. In an embodiment, the self-bias circuit 411 includes: an intrinsic MOS device MN1, a MOS device MN4, a MOS device MP1, and a MOS device MP2, wherein the gates of the MOS device MP1 and the MOS device MP2 are coupled to each other, the body terminal and the source of the MOS device MP1 and the body terminal and the source of the MOS device MP2 are all coupled to the reference voltage Vref. The self-bias circuit 411 is configured to generate the reference current Iref. In an embodiment, the resistor Rp4 is coupled between the gate and the source of the intrinsic MOS device MN1, wherein the self-bias circuit 411 mirrors the reference current Iref to generate the first current I1, and the first current I1 flows through the resistor Rp4.

In an embodiment, as shown in FIG. 7, the bias current generating circuit 420 includes: a current source Is, an identical intrinsic MOS device MN3, a resistor Rp5, and a current mirror circuit 421. In an embodiment, the current source Is is configured to generate a constant current Is1. In an embodiment, the identical intrinsic MOS device MN3 and the intrinsic MOS device MN1 have the same intrinsic threshold voltage Vth (not necessarily the same without any difference, there may be a slight allowable tolerance), the gate and the source of the identical intrinsic MOS device MN3 are respectively electrically connected to the gate and the source of the intrinsic MOS device MN1, and the drain of the identical intrinsic MOS device MN3 is coupled to the current source Is. In an embodiment, the identical intrinsic MOS device MN3 is configured to generate the second current I2, wherein the second current I2 is shunted from the constant current Is1, and the second current I2 is equal to the intrinsic threshold voltage Vth divided by the resistance of the resistor Rp4. Note that the above-mentioned second current I2 is equal to the intrinsic threshold voltage Vth divided by the resistance of the resistor Rp4, which is not necessarily equal without any difference, and there may be a slight allowable tolerance.

Still referring to FIG. 7, in an embodiment, the current mirror circuit 421 is respectively coupled to the current source Is and the first voltage V1 to receive the third current I3. The third current I3 is the constant current Is1 minus the second current I2. The current mirror circuit 421 is configured to amplify and mirror the third current I3 to generate a bias current Ibias which flows through the resistor Rp5 to generate a body bias Vbody. In an embodiment, the resistor Rp5 is coupled between the first voltage V1 and the body bias Vbody, and the MOS device MN30 is configured to block the high voltage of the drain of the MOS device MN30.

In an embodiment, the current mirror circuit 421 has a magnification A, the resistor Rp4 has a resistance R4, the resistor Rp5 has a resistance R5, and the body diode of the MOS switch SW has a forward conduction voltage Vbd. The magnification A, the resistance R4, the resistance R5, the constant current Is1, the intrinsic threshold voltage Vth, the forward conduction voltage (Vbd), and an absolute value of the difference between the first voltage V1 and the second voltage V2 have the following relationship:

$$|V1 - V2| < A \cdot \left(\mathrm{Is} - \frac{Vth}{R1}\right) \cdot R2 + Vbd \qquad \text{(inequation 4)}$$

The inequation 4 shows that in the present embodiment, the offset voltage Vbias is linearly and negatively related to the intrinsic threshold voltage Vth.

Note that, by virtue of the body bias circuit of the present invention, the body bias Vbody of the MOS switch SW is lower than the first voltage V1 and the second voltage V2 to an appropriate level, so that the body effect of the MOS switch SW will not be too strong, and thus the on-resistance will not be too large (on-resistance below preset on-resistance threshold). Moreover, the body effect of the MOS switch SW will not be too weak, so that the leakage current will not be too large (the leakage current is lower than the preset leakage current threshold). In addition, the threshold voltage of the MOS switch SW is configured to reversely track the intrinsic threshold voltage Vth, that is, the offset voltage Vbias is linearly and negatively related to, or non-linearly and negatively related to the intrinsic threshold voltage Vth, so that the on-resistance and leakage current can still be kept within the forementioned target, i.e., the on-resistance being lower than the preset on-resistance threshold and the leakage current being lower than the preset leakage current threshold, and is not significantly affected by process variation of MOS devices.

Figure 8:
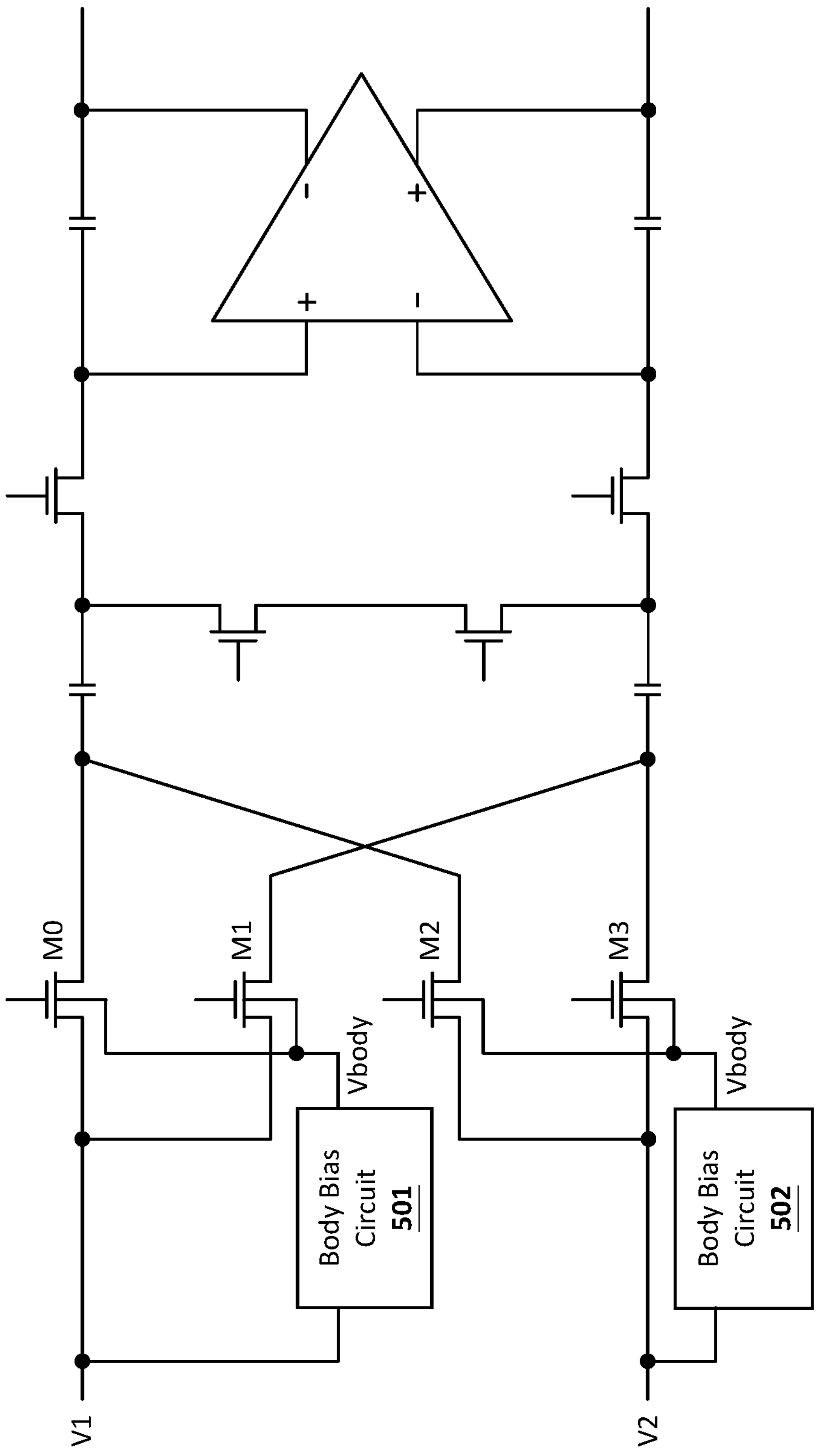
FIG. 8 shows a schematic diagram of the body bias circuit according to an application embodiment of the present invention.

Please refer to FIG. 8, which shows a schematic diagram of the body bias circuit according to an application embodiment of the present invention. In an embodiment, as shown in FIG. 8, the body bias circuit 501 and the body bias circuit 502 of the present invention can be applied in a chopper circuit. In the chopping circuit of FIG. 8, alternately, the MOS device M0 and the MOS device M3 are switched with a same phase which is out-of-phase to another phase with which the MOS device M1 and the MOS device M2 are switched, so as to generate an output signal. In an embodiment, one terminal of the body bias circuit 501 is coupled to the body terminals of the MOS device M0 and MOS device M1, and the other terminal of the body bias circuit 501 is coupled to the source terminals of the MOS device M0 and MOS device M1. One terminal of the body bias circuit 502 is coupled to the body terminals of the MOS device M2 and MOS devices M3, and the other terminal of the body bias circuit 502 is coupled to the source terminals of the MOS device M2 and MOS device M3. Since the first voltage V1 may be greater than or less than the second voltage V2, by virtue of the characteristics of the body bias voltage Vbody provided by the body bias circuit 501 (Vbody1) and the body bias circuit 502 (Vbody2) to the MOS device M0, the MOS device M1, the MOS device M2 and the MOS device M3, the body effect of the MOS device M0, the MOS device M1, the MOS device M2 and the MOS device M3 is controlled within an appropriate range, and is not significantly affected by process variation.

Figure 9:
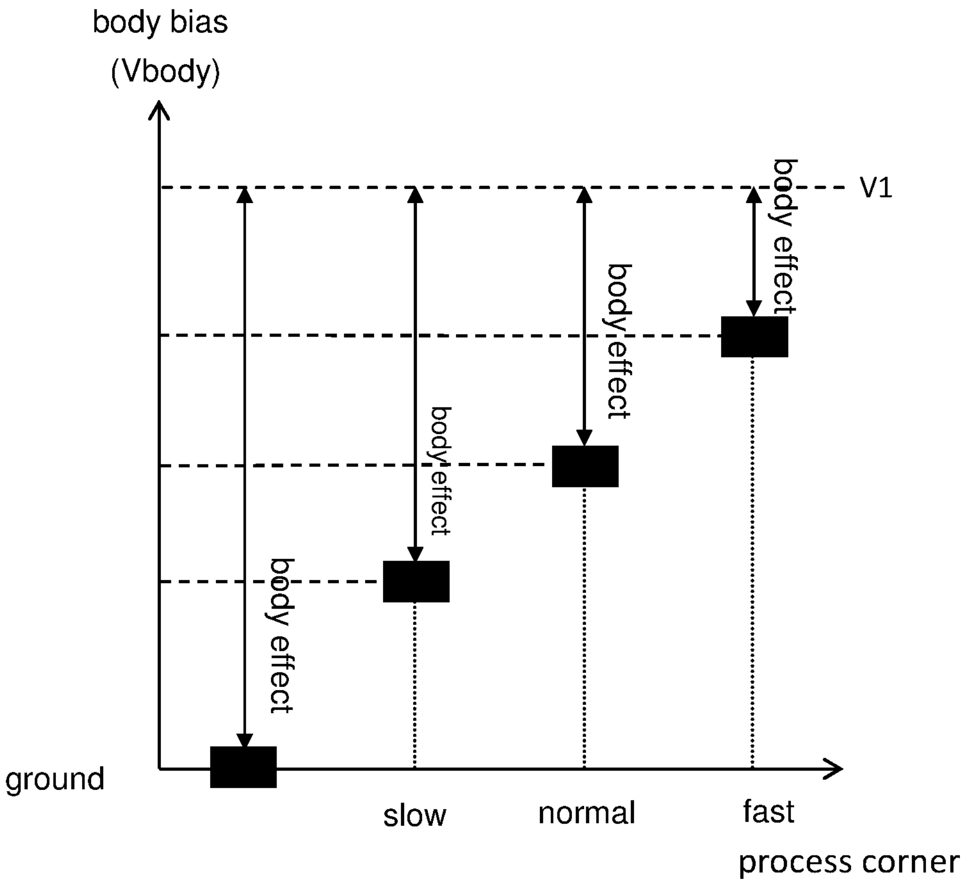
FIG. 9 shows a relationship graph between the body bias and the process corner according to an embodiment of the present invention.

Please refer to FIG. 9 together with FIG. 3. FIG. 9 shows the relationship of the body bias Vbody corresponding to the circuit in FIG. 3 against process corners. The body bias Vbody of the MOS switch SW shown in FIG. 3 is equal to the first voltage V1 minus the intrinsic threshold voltage Vth of the intrinsic MOS device MN1, which can be considered as the body bias Vbody is negatively related to the intrinsic threshold voltage Vth of the intrinsic MOS device MN1. As a result, the threshold voltage of the MOS switch SW positively tracks the intrinsic threshold voltage Vth. FIG. 9 shows the relationship of the body bias Vbody corresponding to the circuit in FIG. 3 against process corners. Due to the process variation of MOS devices, the threshold voltages of different MOS devices of the same specification vary with each other, and can be roughly divided into three levels: higher threshold voltage, general threshold voltage and lower threshold voltage, which can be corresponded to three process corners of slow, normal and fast, respectively. Different process corners will produce different levels of body effects.

In FIG. 9 and FIG. 3, it is assumed that the MOS switch SW and the intrinsic MOS device MN1 have the same specifications, for example, the same intrinsic threshold voltage. When both the MOS switch SW and the intrinsic MOS device MN1 have a higher level of intrinsic threshold voltage (i.e., towards slow corner along the process corner axis), the body bias Vbody (FIG. 3 and FIG. 9) is lower, which leads to stronger body effect and slower conduction characteristics of the MOS switch SW. Taking slow process corner as an example, the body bias Vbody is the lowest among the 3 process corners, and thus the body effect is the strongest. The higher intrinsic threshold voltage of the MOS switch SW in the slow process corner, and the higher body effect of the MOS switch SW due to the higher intrinsic threshold of the MOS device MN1 cause a multiplier effect to make the threshold voltage of the MOS switch SW even higher. As a result, the conduction resistance may be out of the desired range. On the other hand, when both the MOS switch SW and the intrinsic MOS device MN1 are in fast process corner (i.e., having a lower intrinsic threshold voltage), the body bias Vbody is the highest among these 3 process corners, and thus the body effect is the lowest. A similar but opposite direction of multiplier effect may cause threshold voltage of the MOS switch SW even lower. As a result, the leakage current may be out of the desired range.

The present invention can further improve the insufficiency of the above-mentioned embodiment shown in FIG. 3 and FIG. 9. Please refer to FIG. 10 along with FIGS. 4, 5, 6 and 7. In the embodiments shown in FIGS. 4, 5, 6 and 7, the body bias Vbody is positively related to the intrinsic threshold voltage Vth of the intrinsic MOS device MN1. As a desirable result, the threshold voltage of the MOS switch SW reversely tracks the intrinsic threshold voltage Vth, and the offset voltage Vbias is linearly negatively or non-linearly and negatively related to the intrinsic threshold voltage Vth.

Figure 10:
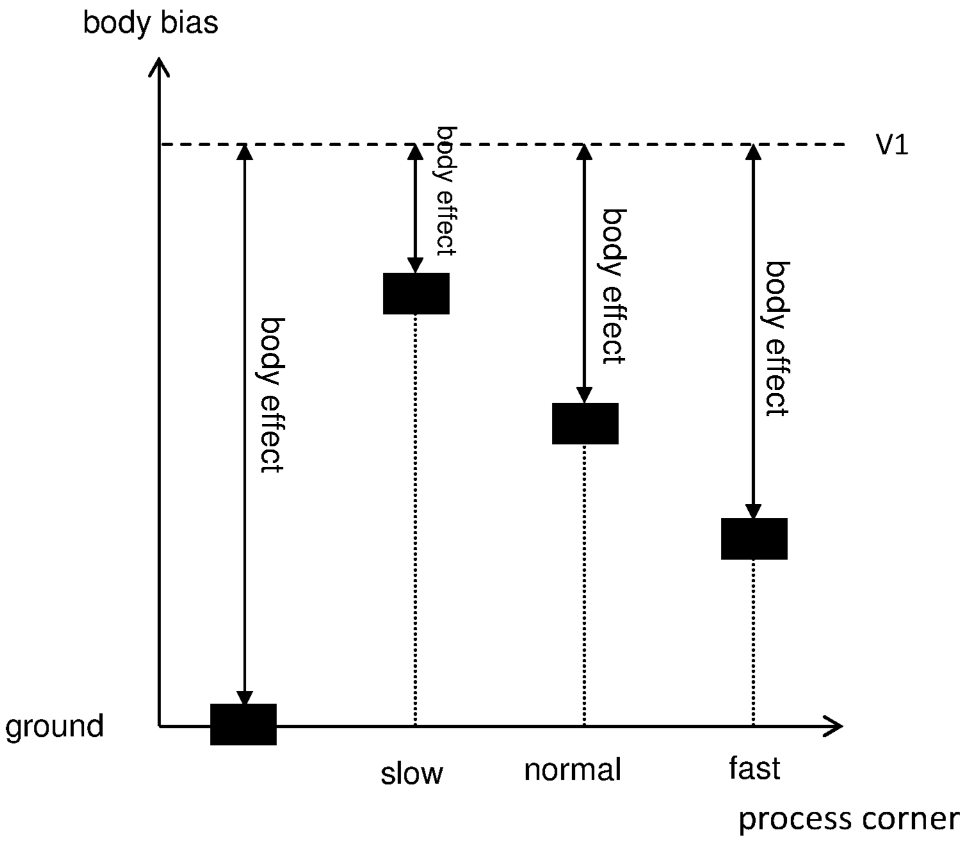
FIG. 10 shows a relationship graph between the body bias and the process corner according to another embodiment of the present invention.

FIG. 10 shows a relationship graph between body bias and process corner according to another embodiment, e.g., corresponding to FIG. 4, 5, 6 or 7, of the present invention.

Compared with the embodiment shown in FIG. 3, in the embodiments shown in FIGS. 4, 5, 6 and 7, through the design of the body bias circuit according to the present invention, the threshold voltage of the MOS switch SW is reversely tracked the intrinsic threshold voltage Vth. As a desirable result, the body effect of the MOS switch SW can be weakened due to the intrinsic MOS device MN1. As shown in FIG. 10, it is assumed that at least one specification, e.g., the intrinsic threshold voltage, of the MOS switch SW and the intrinsic MOS device MN1 are positively correlated. When both the MOS switch SW and the intrinsic MOS device MN1 are in slow process corner (i.e., having a higher intrinsic threshold voltage), the body bias Vbody is the highest among these 3 process corners, and thus the body effect is the lowest. This reverse tracking compensates the conduction resistance of the MOS switch SW to be smaller and to have higher conduction speed compared to FIG. 3. More specifically, in the embodiments shown in 4, 5, 6 or 7, the higher intrinsic threshold voltage of the MOS switch SW and the intrinsic MOS device MN1 in the slow process corner will cause a lower body effect (by a higher body bias Vbody) to alleviate the increment of the threshold voltage of MOS switch SW.

Conversely, when both the MOS switch SW and the intrinsic MOS device MN1 are in fast process corner (i.e., having a lower intrinsic threshold voltage), the body bias Vbody is the lowest among these 3 process corners, and thus the body effect is the highest. This reverse tracking compensates the conduction resistance of the MOS switch SW to be higher and to have lower conduction speed and leakage current, compared to FIG. 3. In summary, the aforementioned reverse tracking scheme compensates the variation of intrinsic threshold voltage caused by process variations, and thus mitigating the variation of the conduction resistance and leakage current.

The present invention has been described in considerable detail with reference to certain preferred embodiments thereof. It should be understood that the description is for illustrative purpose, not for limiting the broadest scope of the present invention. Those skilled in this art can readily conceive variations and modifications within the spirit of the present invention. The various embodiments described above are not limited to being used alone; two embodiments may be used in combination, or a part of one embodiment may be used in another embodiment. For example, other process steps or structures, such as a metal silicide layer, may be added. For another example, the lithography process step is not limited to the mask technology but it can also include electron beam lithography, immersion lithography, etc. Therefore, in the same spirit of the present invention, those skilled in the art can think of various equivalent variations and various combinations, and there are many combinations thereof, and the description will not be repeated here. The scope of the present invention should include what are defined in the claims and the equivalents.

What is claimed is:

1. A body bias circuit configured to generate a body bias for biasing a body terminal of a metal oxide semiconductor (MOS) switch, wherein the body bias circuit comprises:

a first intrinsic MOS device, having the same conductivity type as the MOS switch and having an intrinsic threshold voltage; and an operational regulation circuit, coupled to the first intrinsic MOS device and configured to generate the body bias according to a first voltage at a first terminal of the MOS switch and the intrinsic threshold voltage;

wherein the body bias is lower than the first voltage and a second voltage of a second terminal of the MOS switch; and wherein the operational regulation circuit generates the body bias, so that an on-resistance of the MOS switch is lower than a preset on-resistance threshold when the MOS switch is in a conduction operation, and/or a leakage current of the MOS switch is lower than a preset leakage current threshold when the MOS switch is in a non-conduction operation;

wherein the body bias is the first voltage minus an offset voltage;

wherein a threshold voltage of the MOS switch reversely tracks the intrinsic threshold voltage, and the offset voltage is negatively related to the intrinsic threshold voltage, so that the body bias is positively related to the intrinsic threshold voltage.

2. The body bias circuit of claim 1, wherein the offset voltage is linearly and negatively related to, or non-linearly and negatively related to the intrinsic threshold voltage.

3. The body bias circuit of claim 1, wherein the operational regulation circuit includes:

a reference current generating circuit, configured to receive a reference voltage and generate a reference current positively related to the reference voltage, wherein the reference current flows through the first intrinsic MOS device; and a bias current generating circuit, configured to generate a bias current according to the reference current, so as to generate the offset voltage.

4. The body bias circuit of claim 3, wherein the reference current generating circuit includes:

a first resistor, coupled between the reference voltage and the first intrinsic MOS device; and the first intrinsic MOS device, connected in series with the first resistor.

5. The body bias circuit of claim 4, wherein the bias current generating circuit includes:

a current mirror circuit, configured to mirror and amplify the reference current to generate the bias current; and a second resistor, coupled between the first voltage and the current mirror circuit, so that the bias current flows through the second resistor.

6. The body bias circuit of claim 5, wherein the current mirror circuit has a magnification (A), the first resistor has a first resistance (R1), the second resistor has a second resistance (R2), and a body diode of the MOS switch has a forward conduction voltage (Vbd), wherein the magnification (A), the first resistance (R1), the second resistance (R2), the reference voltage (Vref), the intrinsic threshold voltage (Vth), the forward conduction voltage (Vbd), and an absolute value of a difference between the first voltage (V1) and the second voltage (V2) have the following relationship:

$$|V1 - V2| < A \cdot \frac{R2}{R1} \cdot (Vref - Vth) + Vbd$$

7. The body bias circuit of claim 5, wherein the reference current generating circuit includes a voltage divider circuit for receiving the reference voltage, and generating a reference divided voltage positively related to the reference voltage as a gate-source voltage of the first intrinsic MOS device, the reference divided voltage is configured to control the first intrinsic MOS device to generate the bias current; and wherein the reference current is proportional to the bias current.

8. The body bias circuit of claim 7, wherein the bias current generating circuit includes a bias resistor connected in series with the first intrinsic MOS device, the bias resistor has a bias resistance (R3), and a body diode of the MOS switch has a forward conduction voltage (Vbd), wherein the bias resistance (R3), the reference divided voltage (Vd), the intrinsic threshold voltage (Vth), the forward conduction voltage (Vbd), and an absolute value of a difference between the first voltage (V1) and the second voltage (V2) have the following relationship:

$$|V1 - V2| < R3 \cdot K \cdot (Vd - Vth)^2 + Vbd$$

where K is current constant (WμnCox/2L) of the MOS switch.

9. The body bias circuit of claim 5, wherein the reference current generating circuit includes:

a self-bias circuit, configured to generate the reference current; and a first resistor, coupled between a gate and a source of the first intrinsic MOS device, wherein the self-bias circuit mirrors the reference current to generate a first current which flows through the first resistor.

10. The body bias circuit of claim 9, wherein the bias current generating circuit includes:

a current source, configured to generate a constant current;

a second intrinsic MOS device, having the same intrinsic threshold voltage as the first intrinsic MOS device, a gate and a source of the second intrinsic MOS device respectively electrically connected to the gate and the source of the first intrinsic MOS device, the second intrinsic MOS device coupled to the current source, and the second intrinsic MOS device being configured to generate a second current, wherein the second current is shunted from the current source, and the second current is equal to the intrinsic threshold voltage divided by a resistance of the first resistor; and a current mirror circuit, coupled with the current source and the first voltage, configured to receive a third current, wherein the third current is the constant current minus the second current, and the current mirror circuit amplifies and mirrors the third current to generate the bias current to flow through a second resistor so as to generate the body bias, wherein the second resistor is coupled between the first voltage and the body bias.

11. The body bias circuit of claim 10, wherein the current mirror circuit has a magnification (A), the first resistor has a first resistance (R1), the second resistor has a second resistance (R2), and a body diode of the MOS switch has a forward conduction voltage (Vbd), wherein the magnification (A), the first resistance (R1), the second resistance (R2), the intrinsic threshold voltage (Vth), the forward conduction voltage (Vbd), and an absolute value of a difference between the first voltage (V1) and the second voltage (V2) have the following relationship:

$$|V1 - V2| < A \cdot \left(\text{Is1} - \frac{Vth}{R1}\right) \cdot R2 + Vbd;$$

where Is1 is the constant current.

12. A body bias generation method, configured to generate a body bias, wherein the body bias is provided to a body terminal of a metal oxide semiconductor (MOS) switch, and the body bias generation method comprises:

providing a first intrinsic MOS device, having the same conductivity type as the MOS switch, configured to generate an intrinsic threshold voltage; and generating the body bias according to a first voltage on a first terminal of the MOS switch and the intrinsic threshold voltage;

wherein the body bias is lower than the first voltage and a second voltage on a second terminal of the MOS switch;

wherein an on-resistance of the MOS switch is lower than a preset on-resistance threshold when the MOS switch is in a conduction operation, and/or a leakage current of the MOS switch is lower than a preset leakage current threshold when the MOS switch is in a non-conduction operation;

wherein the body bias is the first voltage minus an offset voltage;

wherein a threshold voltage of the MOS switch reversely tracks the intrinsic threshold voltage, and the offset voltage is negatively related to the intrinsic threshold voltage, so that the body bias is positively related to the intrinsic threshold voltage.

13. The body bias generation method of claim 12, wherein the offset voltage is linearly and negatively related to, or non-linearly and negatively related to the intrinsic threshold voltage.

14. The body bias generation method of claim 12, wherein the step of generating the offset voltage includes:

receiving a reference voltage;

generating a reference current positively related to the reference voltage, wherein the reference current flows through the first intrinsic MOS device; and generating a bias current according to the reference current, and further generating the offset voltage.

15. The body bias generation method of claim 14, wherein the step of generating the reference current positively related to the reference voltage includes: coupling a first resistor between the reference voltage and the first intrinsic MOS device, wherein the first intrinsic MOS device is connected in series with the first resistor.

16. The body bias generation method of claim 15, wherein the step of generating the bias current includes:

mirroring and amplifying the reference current to generate the bias current; and coupling a second resistor between the first voltage and a current mirror circuit, so that the bias current flows through the second resistor.

17. The body bias generation method of claim 16, wherein the current mirror circuit has a magnification (A);

wherein the first resistor has a first resistance (R1), the second resistor has a second resistance (R2), and a body diode of the MOS switch has a forward conduction voltage (Vbd), wherein the magnification (A), the first resistance (R1), the second resistance (R2), the reference voltage (Vref), the intrinsic threshold voltage (Vth), the forward conduction voltage (Vbd), and an absolute value of a difference between the first voltage (V1) and the second voltage (V2) have the following relationship:

$$|V1 - V2| < A \cdot \frac{R2}{R1} \cdot (Vref - Vth) + Vbd$$

18. The body bias generation method of claim 14, wherein the step of generating the reference current positively related to the reference voltage includes: generating a reference divided voltage positively related to the reference voltage, wherein the reference divided voltage is coupled to provide a gate-source voltage of the first intrinsic MOS device, and the reference divided voltage, so as to control the first intrinsic MOS device to generate the bias current; and wherein the reference current is proportional to the bias current.

19. The body bias generation method of claim 18, wherein the step of generating the bias current includes providing a bias resistor connected in series with the first intrinsic MOS device;

wherein the bias resistor has a bias resistance (R3), and a body diode of the MOS switch has a forward conduction voltage (Vbd), wherein the bias resistance (R3), the reference divided voltage (Vd), the intrinsic threshold voltage (Vth), the forward conduction voltage (Vbd), and an absolute value of a difference between the first voltage (V1) and the second voltage (V2) have the following relationship:

$$|V1 - V2| < R3 \cdot K \cdot (Vd - Vth)^2 + Vbd;$$

wherein K is current constant (WμnCox/2L) of the MOS switch.

20. The body bias generation method of claim 14, wherein the step of generating the reference current positively related to the reference voltage includes:

generating the reference current by a self-bias circuit; and coupling a first resistor between a gate and a source of the first intrinsic MOS device, wherein the self-bias circuit mirrors the reference current to generate a first current which flows through the first resistor.

21. The body bias generation method of claim 20, wherein the step of generating the bias current includes:

generating a constant current;

providing a second intrinsic MOS device having the same intrinsic threshold voltage as the first intrinsic MOS device, wherein a gate and a source of the second intrinsic MOS device are electrically connected to the gate and the source of the first intrinsic MOS device, respectively, wherein the second intrinsic MOS device is coupled to the constant current, and the second intrinsic MOS device is configured to generate a second current which is shunted from the constant current and is equal to the intrinsic threshold voltage divided by a resistance of the first resistor;

receiving a third current, which is the constant current minus the second current; and magnifying and mirroring the third current to generate the bias current to flow through a second resistor to generate the body bias, wherein the second resistor is coupled between the first voltage and the body bias.

22. The body bias generation method of claim 21, wherein the step of magnifying and mirroring the third current includes providing a current mirror circuit having a magnification (A);

wherein the first resistor has a first resistance (R1), the second resistor has a second resistance (R2), and a body diode of the MOS switch has a forward conduction voltage (Vbd), wherein the magnification (A), the first resistance (R1), the second resistance (R2), the intrinsic threshold voltage (Vth), the forward conduction voltage (Vbd), and an absolute value of a difference between the first voltage (V1) and the second voltage (V2) have the following relationship:

$$|V1 - V2| < A \cdot \left(\mathrm{Is1} - \frac{Vth}{R1}\right) \cdot R2 + Vbd;$$

where Is1 is the constant current.

* * * * *